April 5, 1966  J. A. MILLER ET AL  3,243,848
EXTRUDING MACHINE WITH AUTOMATIC METERING CONTROL
Filed Dec. 12, 1962  6 Sheets-Sheet 1

INVENTORS.
PAUL L. MILLER
JAMES A. MILLER
BY Caeser and Rivise
ATTORNEYS.

Fig. 3.

INVENTORS.
PAUL L. MILLER
JAMES A. MILLER
BY Caesar and Rivise
ATTORNEYS.

INVENTORS.
PAUL L. MILLER
JAMES A. MILLER
BY
Caesar and Rivise
ATTORNEYS.

April 5, 1966    J. A. MILLER ET AL    3,243,848
EXTRUDING MACHINE WITH AUTOMATIC METERING CONTROL
Filed Dec. 12, 1962    6 Sheets-Sheet 6

INVENTORS.
PAUL L. MILLER
JAMES A. MILLER
BY
Caesar and Rivise
ATTORNEYS.

United States Patent Office 3,243,848
Patented Apr. 5, 1966

3,243,848
EXTRUDING MACHINE WITH AUTOMATIC
METERING CONTROL
James A. Miller, 195 Maple Ave., Media, Pa., and Paul
L. Miller, Warren Ave. and Laurel Drive, Malvern, Pa.
Filed Dec. 12, 1962, Ser. No. 244,034
11 Claims. (Cl. 18—12)

This invention relates to an extruding machine. More particularly, it relates to an improved extruding machine for extruding resins in a plastic form which are subsequently molded into phonograph records.

Phonograph records are currently made by extruding a long, thin plastic rod of thermoplastic material such as a vinyl resin. This material is wound in a spiral form which is approximately four to five inches wide and has a central hole. The wound resin is then placed in a record press of conventional design wherein the finished grooved record is pressed and molded.

The resin which is subsequently pressed is made into the softened plastic rod by means of a heated extruding machine. Basically, this extruding machine comprises a feed-hopper, a heating chamber, a cylinder, a hydraulic piston within the cylinder, and an exhaust nozzle which forms the cylindrical rod. The resin to be extruded is first placed in the hopper from which it enters the heating chamber. In the heating chamber it is softened to the desired degree and flows into the cylinder. The piston within the cylinder is then advanced and extrudes a predetermined amount of resin. This extruding machine can either be manually operated or set to a pre-determined intermittent automatic operation.

One shortcoming of the aforementioned extruding machine is that little or no mixing occurs during the melting and softening of the resin. Thus, it is necessary to feed a pre-compounded homogeneous resin mixture to the hopper. If the resin fed to the hopper is not homogeneous the subsequently extruded resin will in all probability not be homogeneous either. Thus, the finished record may have flaws in it due to the fact of non-homogeneity of the composition from which the record is made.

Using the extruding machine of this invention, it is not necessary to precompound the granular resin particles fed to the hopper. Complete and total compounding will take place within the machine itself. Thus, with this machine, it is possible to feed particulate resin and also scraps from other records, including reject records, to the hopper without the necessity of precompounding. The resultant extruded rod will be completely homogeneous regardless of the exact composition of the different particles and scraps fed to the hopper.

The aforementioned problems of the previous resin extruders are obviated by using a screw-type extruder. Extruders of this type are in common usage. However, none has ever been used prior to this invention for the extrusion of blends of resins which will subsequently be used in the making of records. Furthermore, none of the prior screw-type extruders incorporates the many novel features of this invention.

It is therefore an object of this invention to provide a novel extruding machine.

It is another object of this invention to provide an extruding machine which is particularly adapted for use in the extrusion of plastics which are to be used in the manufacture of phonograph records.

It is a further object of this invention to provide an extruding machine which includes heating means for accurately controlling the temperature of the extruded plastic.

It is a further object of this invention to provide an extruding machine particularly adapted for the extrusion of plastics to be used in phonograph records and includes automatic weighing means to meter a pre-determined amount of plastic.

It is a further object of this invention to provide a novel extruding machine which includes automatic means for starting and stopping the extrusion of the material therefrom.

These and other objects of this invention are accomplished by providing an extruding machine comprising a hopper, a barrel, means for delivering material from said hopper to said barrel, controlled heating means associated with said barrel, a screw within said barrel, an extruding nozzle at the end of said barrel, and means for metering the amount of material extruded through said nozzle.

Other objects and many of the attendant advantages of this invention will be readily appreciated as the same becomes better understood by reference to the following detailed description when considered in connection with the accompanying drawings wherein.

Figures 1, 2:
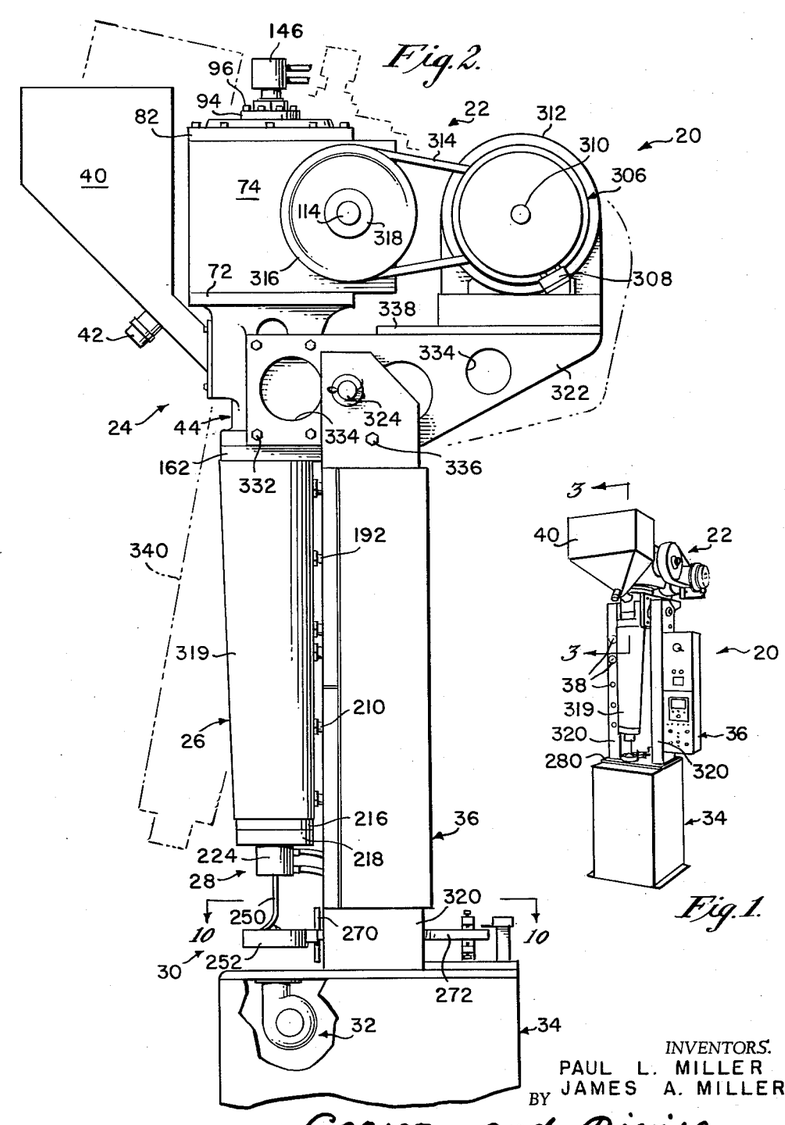
FIG. 1 is a perspective view of the extruding machine of this invention.
FIG. 2 is an enlarged side elevational view, partially broken away and partially in phantom, of the extruding machine of this invention.

Referring now in greater detail to the various figures of the drawings wherein similar reference characters refer to similar parts, an extruding machine embodying the present invention is generally shown at 20 in FIG. 1. Device 20 basically comprises a drive mechanism 22, a feed section 24, a screw section 26, a nozzle 28, a balance 30, and a blower 32. As seen in FIG. 1, the mechanism is mounted on a base 34 and includes suitable controls 36 and gauges 38.

Figure 3:
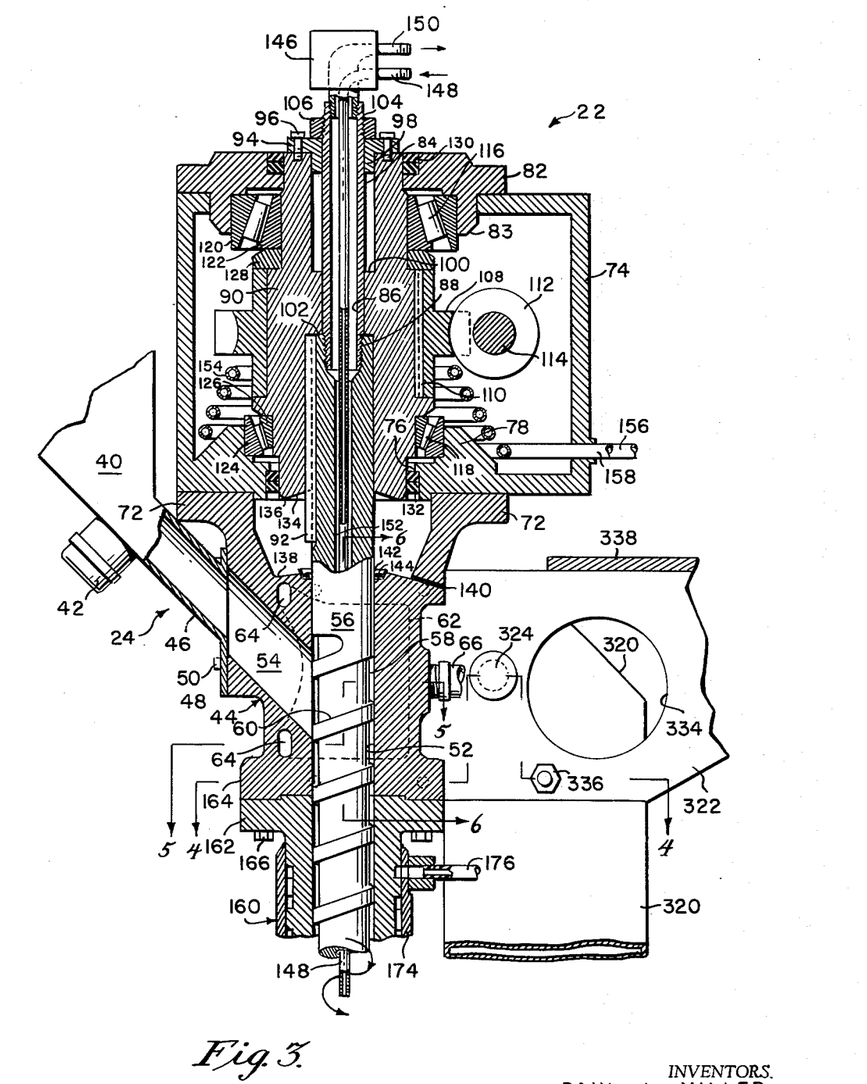
FIG. 3 is an enlarged sectional view taken along the line 3—3 of FIG. 1.

As seen in FIGS. 2 and 3, feed section 24 includes a hopper 40. The granular and pulverulent material which is eventually melted and extruded from the machine is first fed into this hopper. A capped tube 42 which is in communication with the interior of the hopper is provided for withdrawing any material left in the hopper when the use of the machine is terminated, as for maintenance and cleaning. Hopper 40 is connected to casting 44 by means of conduit 46 having an outer vertical flange 48. The flange is secured to the casting by any suitable means such as bolts 50.

Casting 44 is provided with a central cylindrical bore 52. A second downwardly inclined bore 54 connects conduit 46 with central cylindrical bore 52. Rotatably mounted within the bore 52 is a vertical screw 56 having a root 58 and helical thread 60 of generally constant pitch.

Figure 5:
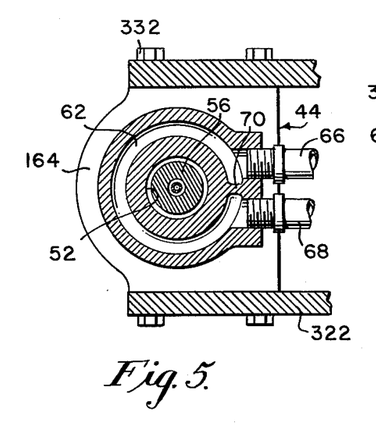
FIG. 5 is a sectional view taken along the line 5—5 of FIG. 3.
Figure 6:
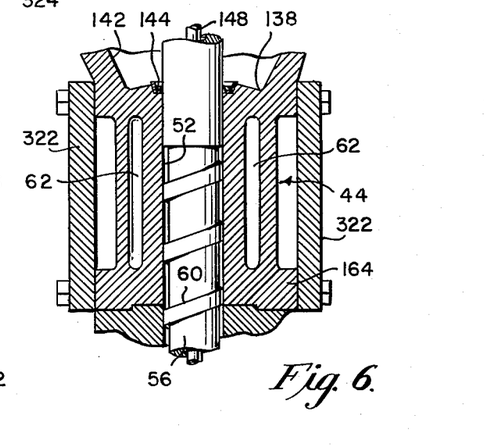
FIG. 6 is a sectional view taken along the line 6—6 of FIG. 3.

The bores 52 and 54 are cooled by water circulating in generally cylindrical channel 62 formed in casting 44 (see FIGS. 3, 5 and 6). Channel 62 extends over and under bore 54, as indicated at 64 in FIG. 3. As seen in FIG. 5, the cooling water enters through inlet pipe 66 and leaves through outlet pipe 68. A suitable barrier 70 is provided between the inlet and outlet pipes in order to insure that the cooling water flows in the same direction at all times.

The drive mechanism 22 is mounted on top of horizontal flanges 72 of casting 44. Basically, drive mechanism 22 includes a gear box 74 having a circular hole 76 cut in the bottom thereof. An annular shoulder 78 surrounds hole 76 and projects inwardly therefrom. The top of gear box 74 is also provided with a hole which is sealed by a cover 82. Cover 82 includes an annular downwardly projecting shoulder 83. Passing through hole 76 of gear box 74 is the top of screw 56. Passing through cover 82 at the top of gear box 74 is a locking shaft 84. Locking shaft 84 is threadedly secured in bore 86 of screw 56 at 88. A drive sleeve 90 is keyed to screw 56 at 92. The drive sleeve is maintained within gear box 74. A bushing 94 is secured to the top of drive sleeve 90 by bolts 96. Bushing 94 is additionally telescoped over locking sleeve 84, and has an annular flange 98 in contact with the locking shaft. Drive sleeve 90 includes an inwardly projecting shoulder 100, against which the top 102 of screw 56 abuts. The top of locking shaft 84 is externally threaded as at 104. A nut 106 is threadedly secured on threads 104 and abuts the top of bushing 94. Thus, it is seen, upon the tightening of nut 106, the top 102 of screw 56 will be drawn tightly against shoulder 100 of drive sleeve 90. When the drive sleeve is rotated, the screw will be held securely in place and rotated at the same time.

A worm wheel 108 is secured to drive sleeve 90 by key 110. Worm wheel 108 is rotated by worm 112 which is mounted on shaft 114.

Drive sleeve 90 is rotatably mounted on upper roller bearings and lower roller bearings 116 and 118, respectively. Upper roller bearings 116 are mounted between outer and inner bearing races 120 and 122, respectively. Likewise, lower roller bearings 118 are mounted between outer and inner bearing races 124 and 126, respectively. A thrust washer 128 is positioned between worm wheel 108 and drive sleeve 90, and upper, inner bearing race 122.

A pair of oil seals 130 are positioned between cover 82 and drive sleeve 90 at the top of the gear box. A second pair of oil seals 132 are positioned between the drive sleeve and the bottom of the gear box. These oil seals are of conventional design and may be made from hard rubber or leather. The bottom of drive sleeve 90 is cut upwardly at 134, leaving downwardly projecting ridge 136. Thus, any of the oil which passes through the lower oil seals 132 will drip from ridge 136, and will be prevented from contacting screw 56 because of the interposed upward cut 134. The dripping oil is collected in an annular sump 138 formed in the top of casting 44. Any oil in the sump is withdrawn through downwardly projecting hole 140 formed in the casting. The top of casting 44 is additionally provided with an annular groove 142 adjacent screw 56. This groove is filled with a felt seal 144. The purpose of this seal is to prevent any of the resin powder entering the screw from leaving the top of the screw and getting into the gear box.

Figures 7, 8, 9:
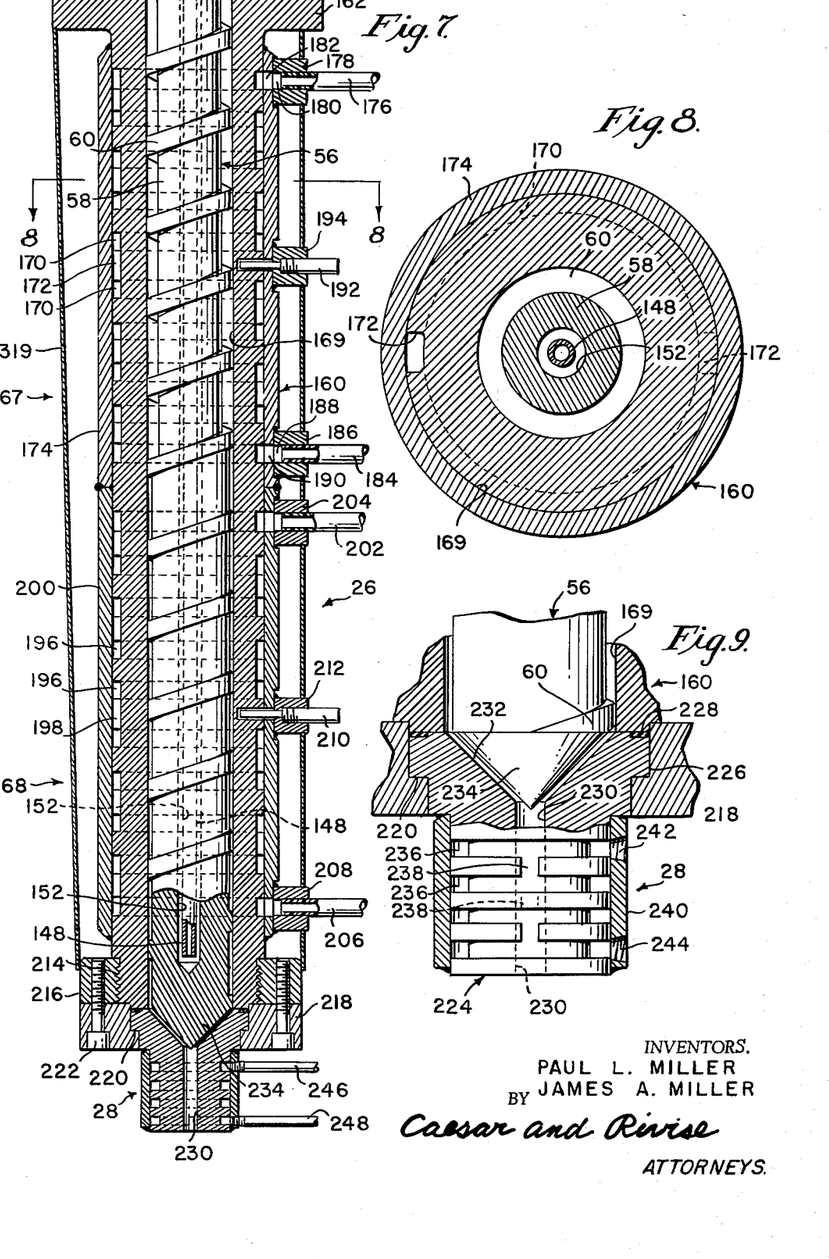
FIG. 7 is a sectional view of the barrel and screw of the extruding machine of this invention.
FIG. 8 is an enlarged sectional view taken along the line 8—8 of FIG. 7.
FIG. 9 is a fragmentary view, partially in section, of the lower tip of the screw and the extruding nozzle.

Threadedly secured in the top of locking shaft 84 is a rotary union 146. This rotary union is of a conventional design which is well-known to the art. Rotary union 146 includes a water inlet tube 148 and a water exhaust tube 150. Water inlet tube 148 passes through locking shaft 84 and the entire length of screw 56. The water tubes 148 and 150 are in two sections, with the splits being in rotary union 146. Thus, the lower portions are free to rotate while the upper portions remain stationary. This is the normal function of a rotary union. As seen in FIG. 3, screw 56 is provided with a central bore 152 for receiving the lower portion of tube 148. Central bore 152 is slightly larger in diameter than the external diameter of tube 148. In use, cooling water enters the top of tube 148, passes through the rotary union 146, and down through the entire screw 56. The bottom of tube 148 is slightly spaced from the bottom of central bore 152 of the screw (FIG. 7). Thus, cooling water is discharged by reversing its direction and passing through the annular space between the walls of bore 152 and the outer wall of tube 148. The water is eventually discharged through tube 150. The gear box 74 is cooled by means of water cooling coils 154 having inlet 156 and outlet 158.

The particulate resin is fed from feed section 24 into screw section 26 by screw 56. Screw section 26 includes barrel 160 having upper horizontal flange 162 (see FIG. 7). As seen in FIG. 3, flange 162 is secured to lower horizontal flange 164 of casting 44 by suitable means such as bolts 166.

Screw section 26 is divided into an upper zone 167 and a lower zone 168. Barrel 160 is provided with a central circular bore 169 which extends the full length thereof. Screw 56 is received within bore 169. The internal diameter of bore 169 is similar to but slightly larger than the external diameter of screw flight 60. Thus material entering the bore will be conveyed solely by the screw threads and will not pass outside of the threads. The outer perimeter of the portion of barrel 160 in upper zone 167 is provided with a plurality of equally spaced horizontal circular grooves 170. These grooves are connected by vertical channels 172. As seen in FIGS. 7 and 8, successive channels 172 are 180° out of phase, with alternate channels being aligned. Grooves 170 are enclosed by sleeve 174 which is welded to barrel 160.

A pipe 176 is mounted within hole 180 of boss 178. The boss is secured to sleeve 174 in the area adjacent uppermost groove 170 in the upper zone 167. Hole 182 in sleeve 174 joins hole 180 with the uppermost groove 170. A second pipe 184 is mounted in hole 188 of boss 186 in the area adjacent lowermost groove 170 in the upper zone 167. Hole 190 in sleeve 174 joins groove 170 to hole 188.

In use, cooling liquid or heating gas or liquid are lead into the uppermost groove 170 through pipe 176. The heating fluid then follows the tortuous path formed by the horizontal grooves 170 and the vertical channels 172 which are successively out of alignment with each other. In this manner, the heating or cooling fluid is completely circulated around the barrel. The fluid leaves the lowermost groove 170 through lower pipe 184. A thermistor 192 mounted in boss 194 is used to determine the termperature within the bore of barrel 160 in upper zone 167. A thermistor which has been found suitable for this use is Fenwal Model No. 74110–103. Of course, other temperature measuring devices, such as thermocouples, may also be used.

Lower zone 168 is constructed in substantially the same manner as upper zone 167. Thus, barrel 160 is provided with a plurality of equally spaced horizontal circular grooves 196. These grooves are connected by vertical channels 198. As with upper zone 167, successive channels 198 are 180° out of phase as they progress downwardly. Thus, alternate channels 198 are vertically aligned. Grooves 196 are enclosed by sleeve 200.

As with upper zone 167, lower zone 168 is provided with a fluid inlet pipe 202 secured in boss 204 adjacent the upper groove 196. Likewise, an outlet pipe 206 is secured in boss 208 adjacent the lowermost groove 196. A thermistor 210 mounted in boss 212 is provided for determining the temperature in barrel 160 in lower zone 168.

It is thus seen that upper zone 167 and lower zone 168 are substantially identical in most respects. The one major distinction between the two zones is that the root 58 of screw 56 is of a smaller diameter in upper zone 167 than it is in lower zone 168. Thus, the root is shallow in the lower zone and deep in the upper zone. The purpose of the change in root diameter will be explained hereinafter.

The lower end of barrel 160 is externally threaded as at 214. A nut 216 is threadedly secured thereto. A collar 218 having an inwardly projecting annular shoulder 220 is secured against the bottom of nut 216 by bolts 222. The purpose of shoulder 220 is to support nozzle 28.

Nozzle 28 basically comprises a barrel or cylinder 224 (FIG. 9). Barrel 224 includes an integral circular flange at its top which rests on shoulder 220 of collar 218. A sealing ring 228 is provided between flange 226 and the bottom of barrel 160.

Nozzle barrel 224 includes a central circular bore 230, through which the compounded and melted resin will be extruded. The top of barrel 224 is provided with a downwardly tapering conical recess, having the apex of the cone at the top of bore 230. The base of the cone has substantially the same diameter as the internal diameter of bore 169 of barrel 160. Thus, material leaving the end of bore 169 will immediately flow into conical recess 232. The bottom of screw 56 is provided with a conical tip 234 which extends into recess 232, but is slightly spaced from the walls of the recess. As seen in FIG. 9, barrel 224 is provided with a plurality of equally spaced, horizontal circular grooves 236, much in the same manner as barrel 160. The grooves are connected by vertical channels 238. Here again, only one channel 238 connects every pair of adjacent grooves 236, with each successive channel being 180° out of phase with the preceding channel. Channels 236 are enclosed by a sleeve 240 which is welded to the barrel 224. Sleeve 240 is provided with an upper threaded hole 242 adjacent the uppermost groove 236. Likewise, a lower threaded hole 244 is provided adjacent the lowermost groove 236. Pipe 246 is threadedly secured in hole 242 and pipe 248 is threadedly secured in hole 244 (FIG. 7). In use, cooling liquid or heating fluid will enter pipe 246 and follow a tortuous path through the grooves and exit through pipe 248.

Figure 10:
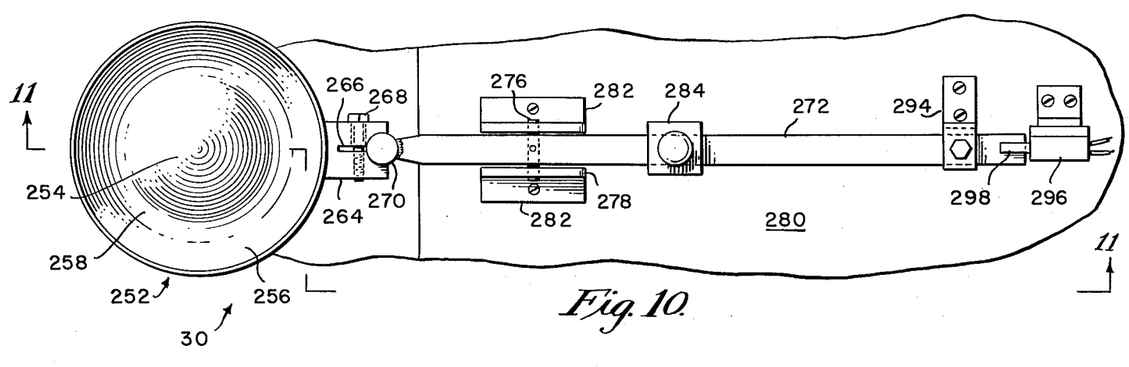
FIG. 10 is an enlarged sectional view taken along the line 10—10 of FIG. 2.
Figure 11:
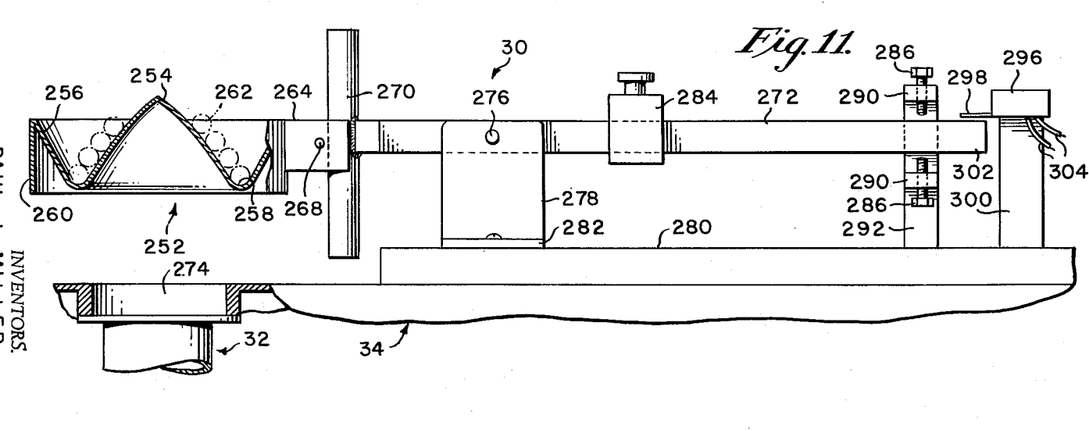
FIG. 11 is a sectional view taken along the line 11—11 of FIG. 10.

As seen in FIG. 2, the material exiting from nozzle 28 is in the form of a rod of soft plastic 250. Rod 250 is received on balance 30, which is best illustrated in FIGS. 10 and 11. Balance 30 includes a receiving trough 252. Trough 252 has a conical center 254 with the apex being uppermost. The inner wall 256 of the trough tapers outwardly, leaving a valley 258 between the inner wall and conical center 254. The trough further includes an outer cylindrical wall 260. The rod of resin 250 emanating from the nozzle 28 automatically winds around the cone 254, as shown in phantom at 262. The cone of resin is also shown in perspective at 262 in FIG. 12.

A collar 264 having one end secured to outer cylindrical wall 260 and an arcuate opening at the other end is provided. A longitudinal slot 266 extends inwardly from the arcuate slot. A set screw 268 extends transversely across the slot and is received in a threaded opening in the collar. A vertical rod 270 is welded on one end of a horizontal bar 272. Trough 252 is mounted on rod 270 by the arcuate opening in collar 264 engaging the rod. Trough 252 is vertically and rotatably adjustable on rod 270 by loosening set screw 268 and moving the trough to the desired position. Blower 32 having an outlet opening 274 is positioned beneath trough 252.

Bar 272 is secured to pin 276 which is in turn rotatably mounted in U-shaped bracket 278. Bracket 278 is secured to platform 280 by horizontal flanges 282. A counterweight 284 is frictionally slidable on bar 272 on the side of pin 276 opposite trough 252. A pair of adjustable set screws 286 are provided for limiting the pivotal movement of bar 272 on pin 276. Set screws 286 are threadedly secured in horizontal arms 290 of vertical bar 292. Bar 292 is secured to platform 280 by horizontal flange 294.

A microswitch 296 having a resiliently mounted contact finger 298 is mounted on bracket 300 which is secured to platform 280. When the pre-determined weight of resin 262 is deposited on cone 254, end 302 of bar 272 will be pivoted upwardly thereby contacting finger 298. This in turn will open microswitch 296. As soon as the resin is removed from trough 252, end 302 of the bar will again return to its lower position thereby breaking contact with finger 298, thus closing the microswitch again.

Microswitch 296 is electrically connected through leads 304 to brushes 306 on magnetic clutch 308 (see FIG. 2). Magnetic clutch 308 is secured to shaft 310 of motor 312.

The magnetic clutch assembly used for this invention is of conventional design. A magnetic clutch that has been found to be particularly effective is that sold under the trademark Electro-Sheave by the Warner Electric Brake and Clutch Co., Beloit, Wisconsin. The mechanism includes an armature-sheave assembly which is positioned between the magnetic clutch 306 and motor 312, although not shown in FIG. 2. The armature-sheave assembly is freely rotatable and slidable on shaft 310. The magnetic clutch is constantly rotated on shaft 310 by the motor 312. When microswitch 296 is closed, current is passed into the rotating magnetic clutch 306 by brushes 308. The resultant electricity flowing through the coil in the clutch magnet creates electromagnetic force. This force attracts and locks the driven armature-sheave assembly to the driving magnet assembly. When microswitch 296 is opened by the end of bar 272 contact finger 292, the current passing to the brushes is terminated. This in turn terminates the electromagnetic force in the clutch magnet. The armature-sheave assembly will then be forced away from the clutch magnet by a suitable means such as springs, and remain stationary while the magnetic clutch continues to rotate.

Belt 314 is mounted on the sheave of the armature-sheave assembly described above. It is also mounted on driving sheave 316. Driving sheave 316 is in turn secured to shaft 114 (see FIG. 3) by collar 318.

It thus becomes apparent that whenever the armature-sheave assembly is rotated, the driving shaft 114 will likewise be rotated. Thus, so long as microswitch 296 is closed, the screw 56 will be rotated, thereby extruding the resin therefrom. When the predetermined weight of resin has been deposited in trough 252, the microswitch will be opened thereby stopping rotation of the scerw and further extrusion.

Figure 4:
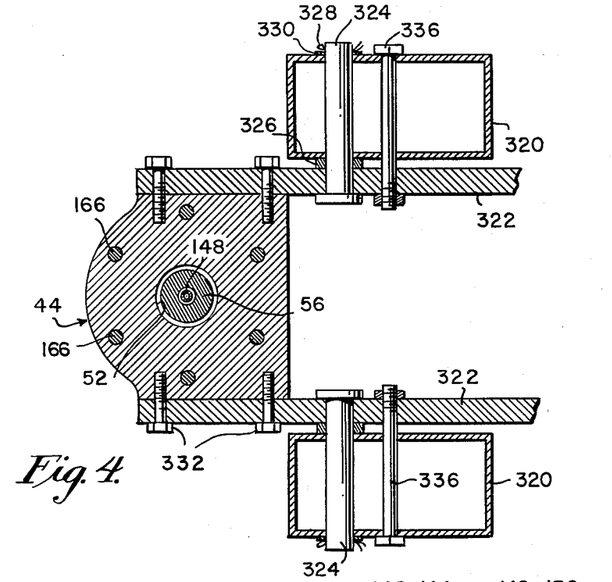
FIG. 4 is a sectional view taken along the line 4—4 of FIG. 3.

The entire assembly is supported on base 34 (FIG. 1). A decorative casing 319 encases the barrel 160 (FIGS. 1 and 7). Secured to the top of base 34 is platform 280 (FIGS. 1 and 11). Mounted on platform 280 are a pair of spaced, vertical, hollow, supporting columns 320. A pair of plates 322 are pivotally mounted on columns 320 by shanks 324 (FIG. 4). Plates 322 are spaced from columns 320 by bushings 326 which are telescoped over the shanks. The shanks are held in place by cotter pins 328 and washers 330. As seen in FIGS. 3 and 4, casting 44 is secured to plates 322 by bolts 332. Plates 322 are additionally provided with lightening holes 334. Locking bolts 336 are used to prevent the pivoting of plates 322 on shanks 324.

Gear box 74 is also supported by plates 322 since it is mounted on casting 44. As seen in FIG. 2, motor 312 and magnetic clutch 308 are mounted on horizontal plate 338 which is in turn mounted on plates 322.

It thus becomes apparent that, when locking bolts 336 are removed, the entire assembly comprising screw section 26, casting 44, hopper 40, gear box 74 and motor 312 are pivotable around shanks 324. Thus, the aforementioned assembly can be pivoted out of operative position to the position shown in phantom at 340 in FIG. 2. The purpose of providing this pivotable arrangement is to allow for the ready removal of screw 56 for servicing and cleaning. Thus, screw 56 may be removed by first removing collar 218 (FIG. 7) which in turn will permit for the removal of nozzle 28. Thereafter, nut 106 (FIG. 3) and rotary union 146 are removed from locking shaft 84 thereby permitting the locking shaft and screw to drop out of the bottom of bore 169 of barrel 160. After the screw has been serviced, it is readily replaced within the bore by reversing the above procedure.

Figures 12, 13:
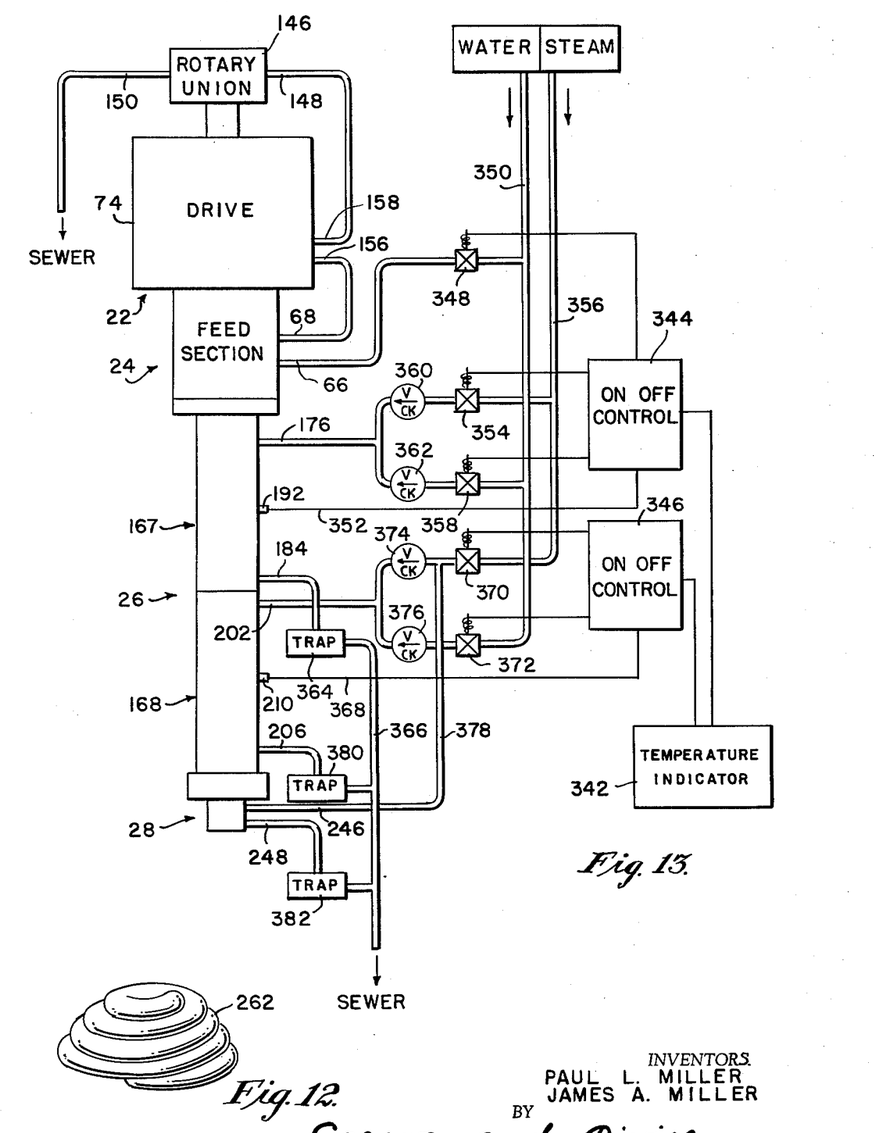
FIG. 12 is a perspective view of an extruded coil of resin formed on the machine of this invention.
FIG. 13 is a schematic piping and wiring diagram for the machine of this invention.

A piping and wiring diagram for the heating and cooling system of the extruding machine is schematically shown in FIG. 13. Prior to starting the machine, the desired temperature is set for upper zone 167 and lower zone 168 of the screw assembly 26 on temperature indicator 342. Although the temperature indicator can be of any common design, Fenwal Model No. 58003–10 has been used. The temperature set on the indicator is then transmitted to controls 344 and 346 for the upper and lower zones respectively. Controllers 344 and 346 maintain the temperatures in the two zones within a close degree of tolerance. Fenwal Model No. 53602 controllers have been used for this purpose.

When the machine is started, the water and steam inlets to the machine are opened. As soon as controller 344 is turned on, solenoid 348 will be opened. This in turn permits water in pipe 350 to enter the feed section 24 through pipe 66. After circulating within the feed section, the cooling water leaves through pipe 68 and enters gear box 74 through pipe 156. Water leaving gear box 74 through pipe 158 enters pipe 148 into the rotary union. It will be recalled that pipe 148 extends throughout the full length of screw 56 and exists through bore 152 in the screw. Upon leaving the bore of the screw, the water passes through rotary union 146 again and out through pipe 150 where it is subsequently discharged to a sewer. It is thus seen that during the entire time the machine is in operation, the feed section, gear box and bore of screw 56 will be continually cooled.

The temperature within upper zone 167 is continually determined by thermistor 192 which is connected to controller 344 by the line 352. Thus, if the temperature within upper zone 167 becomes too high, controller 344 will automatically close solenoid 354 connected to steam line 356 and open solenoid 358 connected to water line 350. If the upper zone becomes too cool, the procedure is reversed with solenoid 358 being closed and solenoid 354 being opened. Check valves 360 and 362 are provided on the steam and water lines respectively. The water or steam exiting from upper zone 167 passes through pipe 184 to tap 364 and then through pipe 366 to a sewer. By using the steam and water arrangement disclosed, the temperature within the barrel can easily be maintained within a 3° to 5° range.

Lower zone 168 is controlled in substantially the same manner as upper zone 167. Thus, thermistor 210 is connected to controller 346 through line 368. Solenoids 370 and 372 are provided on the steam and water lines, respectively. Similarly, check valves 374 and 376 are also provided. It should be noted, however, that thermistor 210 is also used to control the temperature within nozzle 28. Thus, whenever lower zone 168 is heated, steam will also pass through line 378 to the nozzle. However, when the lower zone is cooled, there will be no fluid passing to the nozzle. Traps 380 and 382 are provided for the outlet lines on the lower zones and nozzle, respectively.

In summary, the purpose of the machine of this invention is basically to convey, heat, compound and extrude either powder or granular vinyl resin of the manufacture of phonograph records. The machine is comprised of a screw revolving in the center of a barrel, and extending through a feed section into a reduction drive.

At the opposite end of the screw, a nozzle is attached to the barrel for the purpose of shaping and creating back pressure for sufficient mixing of the extruded material. Below the nozzle a balance receives the extruded material and stops the machine when a pre-determined amount is extruded.

The operation of the machine is begun by starting motor 312. Since microswitch 296 is normally closed, the magnetic clutch is actuated thereby engaging the armature-sheave. Thus, belt 314 will be turned thereby driving shaft 114. This in turn rotates worm 112 which drives worm wheel 108. Worm wheel 108 in turn will rotate screw 56 which is keyed thereto. The water cooling coils 154 in the gear box insure a high degree of runing reliability for the drive mechanism.

With the screw rotating, the resin to be extruded is fed into hopper 40. This resin may be a homogeneous mixture of a single resinous composition or it can be a heterogenous mixture of parts, scraps and granules of various thermoplastic resinous compositions. A preferred, but not limiting, particulate mixture that can be used comprises 98% polyvinyl chloride, 0.5% carbon black, and 1½% stabilizer. The stabilizer usually used is lead stearate. If desired, the amount of polyvinyl chloride can be reduced and replaced by an equivalent amount of filler, such as atomite. The resin entering the top of the screw is kept in a practiculate flowable unmelted condition by the presence of channel 62 which has cooling water constantly circulating therethrough. The purpose of keeping the resin in this form is to prevent any softening and caking in the feed section, thereby preventing continued flow of the resin.

The powdered resin is then forced vertically downward through bore 52 by screw 56. In upper zone 167 the material is mixed and will begin to fuse. The upper zone is normally held at a temperature between 200° F. and 225° F. A particular feature of this invention is the fact that the walls of the bore 169 of barrel 160 are kept at a much higher temperature than the root 58 of screw 56. This is accomplished by the heating of barrel 160 by passing steam through grooves 170. At the same time, screw 56 is internally cooled by constantly passing water through tube 158 which return through bore 152 of the screw. In this manner, the resin abutting the root of screw 56 will be in contact with a cool surface whereas the resin abutting the walls of bore 169 will be in contact with a heated surface. The opposed forces of hot and cold aid in promoting a shearing action on the resin by the revolving screw. This in turn results in greater mixing than could normally be accomplished solely by the rotating of the screw in the advancing of the resin by screw threads 60.

The material leaving upper zone 167 enters lower zone 168. In the lower zone, the powdered resin is rendered completely homogeneous and is melted or fused to a semi-liquid state which is much in the nature of soft tar. The lower zone and the nozzle 28 are maintained at a temperature between about 250° F. and 300° F. Thermistor 210 signals the controller for this zone which in turn allows for the entry of either steam or water to maintain the desired temperature. As pointed out above, the heating of the nozzle takes place every time steam enters lower zone 168. In the lower zone, the increased root diameter aids in the compression, shearing and working of the properly fused resin. The material leaving the lower zone is in a softened, plastic, non-porous form.

The nozzle 28 is located at the end of lower zone 168. As the material reaches the end of the screw threads, a resistance to flow is caused by a small orifice in the nozzle. This sets up a back pressure within the barrel and helps to assure good mixing of the composition. The nozzle also shapes the extruded material into rod-like form 250 (FIG. 2).

As the extruded resin composition leaves the nozzle, it is received on cone 254 of trough 252. The shape of the cone causes the material to wind in a circular motion. If the winding does not occur in this manner, the situation can be remedied by either raising or lowering the cone or pivoting the cone to either side around rod 70. When a set weight is extruded, the balance arm 272 will be pivoted upwardly whereby end 302 will contact finger 298 of microswitch 296. This in turn will stop the magnetic force in magnetic clutch 306, which in turn will stop drive shaft 314. This results in complete stoppage of the machine and no further extrusion will take place since the screw is no longer being rotated. An operator will then remove the extruded spiral of material from the machine and place it in a record press where it is subsequently formed into a finished record. As soon as the material has been removed, the balance will automatically return to its lower position thereby breaking contact between end 302 of arm 272 and microswitch 296, thus closing the circuit in the microswitch. The machine is automatically re-started thereby extruding more material.

The amount of material being extruded can be regulated by counterweight 284. Thus, the extruder can be used in the manufacture of any size record. In setting counterweight 284, alowance is made for the fact that part of the material weight will be supported by the machine since not all of the extruded material is deposited directly on the cone. This condition is shown in FIG. 2.

One advantage of using the magnetic clutch is that motor 312 is continually running, with the clutch constantly rotating. Thus, stopping and starting of drive shaft 314 is substantially instantaneous with the opening and closing of microswitch 296. However, in certain applications, a direct drive motor can be electrically connected to microswitch 296, without the necessity of using a magnetic clutch. The gearing and pulley system would still be used. The operation of the machine would be identical in this instance. However, there would be a slight delay in allowing the motor to start up after it had been stopped.

Blower 32 is used to provide a continuous current of cool air against the bottom of cone 254. The purpose of this air is to keep the cone cool enough to allow the hot extruded resin to curl properly. A second purpose is to prevent the sticking of the resin to the cone.

Although this invention has been described as being particularly useful in the manufacture of phonograph records, it can also be used for extruding any thermoplastic material when a homogeneous, nonporous resin is desired.

Obviously, many modifications and variations of the present invention are possible in the light of the above teachings. For instance, rather than using the steam and water heating system, it would also be possible to use electrical heating and air cooling. One shortcoming of electrical heating, however, is that temperature control is not accurate as when using water cooling in combination with steam heat. However, it has been found that electricity is effective and accurately controlled for heating nozzle 28. It is, therefore, to be understood that within the scope of the appended claims, the invention may be practiced otherwise than as specifically described.

What is claimed as the invention is:

1. An extruding machine comprising a hopper, a barrel, means for delivering material from said hopper to said barrel, controlled heating means associated with said barrel, a screw rotatably mounted within said barrel, an extruding nozzle at the end of said barrel, and means for metering the amount of material extruded through said nozzle, said means for metering said material including a pivot arm and switch means adapted to be contacted by said pivot arm during its pivoting, whereby contact of said switch means will automatically stop or start the rotation of said screw and the consequent extrusion, said barrel, screw and nozzle being substantially vertical, and said metering means being positioned below said nozzle, whereby the material emanating from said nozzle will pivot said pivot arm.

2. The invention of claim 1 wherein means are provided for heating said nozzle.

3. The invention of claim 1 wherein said barrel is provided with a plurality of grooves for the circulation of heating fluid therethrough, said grooves comprising a plurality of enclosed equally spaced circular grooves around the outer perimeter of said barrel, each of these grooves being connected with the next adjacent groove by a channel.

4. The invention of claim 3 wherein each successive channel is out of alignment with the previous channel whereby the heating fluid may follow a tortuous path through said barrel.

5. The invention of claim 1 wherein said barrel is provided with means for circulating a heating fluid therethrough, a first pipe connected to said barrel for introducing said heating fluid and a second pipe connected to said barrel for withdrawing said heating fluid, said first pipe being selectively connected to a source of heating fluid and a source of cooling fluid, and means connected with said sources for controlling which fluid will enter said first pipe.

6. The invention of claim 5 and further including means on said barrel for determining the temperature within said barrel to thereby operate said controlling means in order to regulate which fluid will enter said first pipe.

7. The invention of claim 1 wherein said pivot arm includes a trough at one end for receiving material extruded from said nozzle.

8. The invention of claim 7 wherein said trough is vertically and rotatably adjustable on said pivot arm.

9. The invention of claim 7 and further including an adjustable counterweight on said pivot arm, said counterweight being located on the side opposite said trough with respect to the pivot point of said arm.

10. An extruding machine comprising a hopper, a barrel, means for delivering material from said hopper to said barrel, controlled heating means associated with said barrel, a screw rotatably mounted within said barrel, an extruding nozzle at the end of said barrel, and means for metering the amount of material extruded through said nozzle, said means for metering said material including a pivot arm and switch means adapted to be contacted by said pivot arm during its pivoting, said pivot arm including a trough at one end for receiving material extruded from said nozzle, said trough being vertically and rotatably adjustable on said pivot arm, and said trough including a central conical portion, with the apex being uppermost, and on which said extruded material will be automatically wound, whereby the weight of said extruded material in said trough will cause the pivoting of said pivot arm thereby contacting said switch means, and said switch means will automatically stop and start the rotation of said screw and the consequent extrusion.

11. An extruding machine comprising hopper, a barrel, means for delivering material from said hopper to said barrel, controlled heating means associated with said barrel, a screw rotatably mounted within said barrel, an extruding nozzle at the end of said barrel, means for metering the amount of material extruded through said nozzle, said metering means including means for automatically stopping and starting the extrusion, and a pair of vertical supports, a bracket pivoted to each of said supports and said barrel being supported by said brackets, whereby said brackets may be pivoted in order to move said barrel out of its operative position in order to remove said screw therefrom for servicing.

References Cited by the Examiner

UNITED STATES PATENTS 906,297  12/1908  Royle ______________ 18—12 X
1,466,509  8/1923  Laskey.

(Other references on following page)

UNITED STATES PATENTS

| | | | |
|---|---|---|---|
| 1,902,295 | 3/1933 | Shook | 18—12 |
| 2,156,895 | 5/1939 | Godat | 18—21 |
| 2,499,398 | 3/1950 | Lyon | 18—12 |
| 2,541,201 | 2/1951 | Buecken et al. | 18—12 |
| 2,574,907 | 11/1951 | Bucken | 18—12 |
| 2,645,447 | 7/1953 | Clark et al. | 18—21 |
| 2,688,770 | 9/1954 | Henning | 18—12 |
| 2,737,089 | 3/1956 | Baumgartner. | |
| 2,780,834 | 2/1957 | Bernhardt | 18—12 |
| 2,787,022 | 4/1957 | Chisholm | 18—12 |
| 2,803,851 | 8/1957 | Baunlich et al. | |
| 2,854,691 | 10/1958 | Strong | 18—21 X |

J. SPENCER OVERHOLSER, *Primary Examiner.*

WILLIAM J. STEPHENSON, *Examiner.*